O. T. WAITE.
GRASS TWINE MACHINE.
APPLICATION FILED MAR. 22, 1910.
1,000,763.
Patented Aug. 15, 1911.
2 SHEETS—SHEET 2.
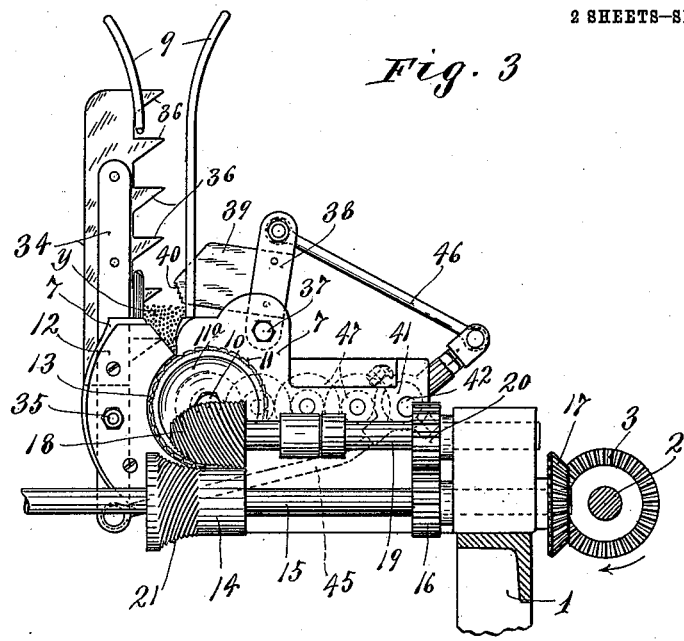
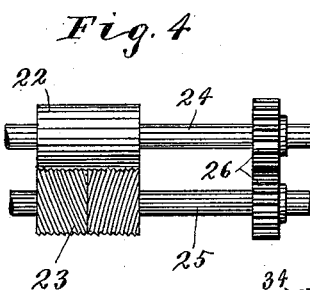
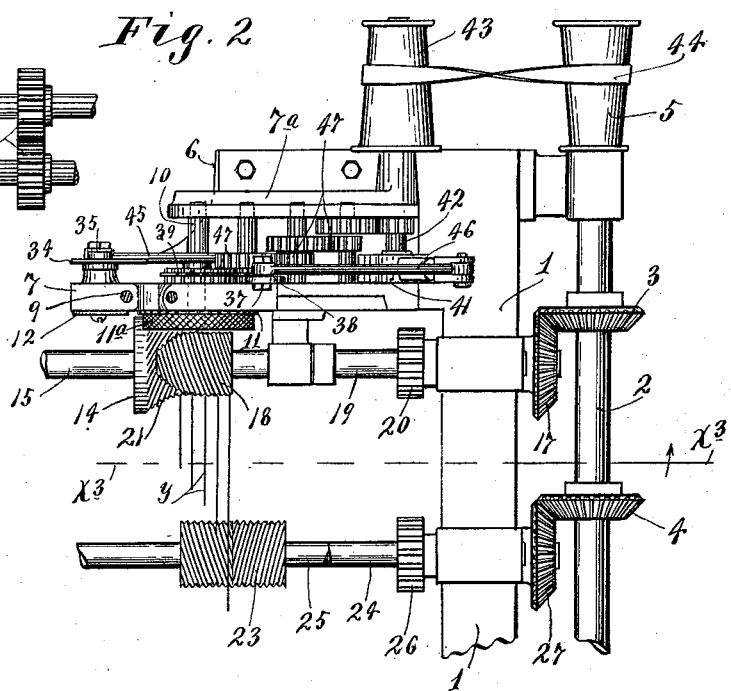
Witnesses.
Ephraim Banning
Thomas A. Banning Jr.
Inventor.
Ossian T. Waite.
By his Attorneys.
Banning & Banning.

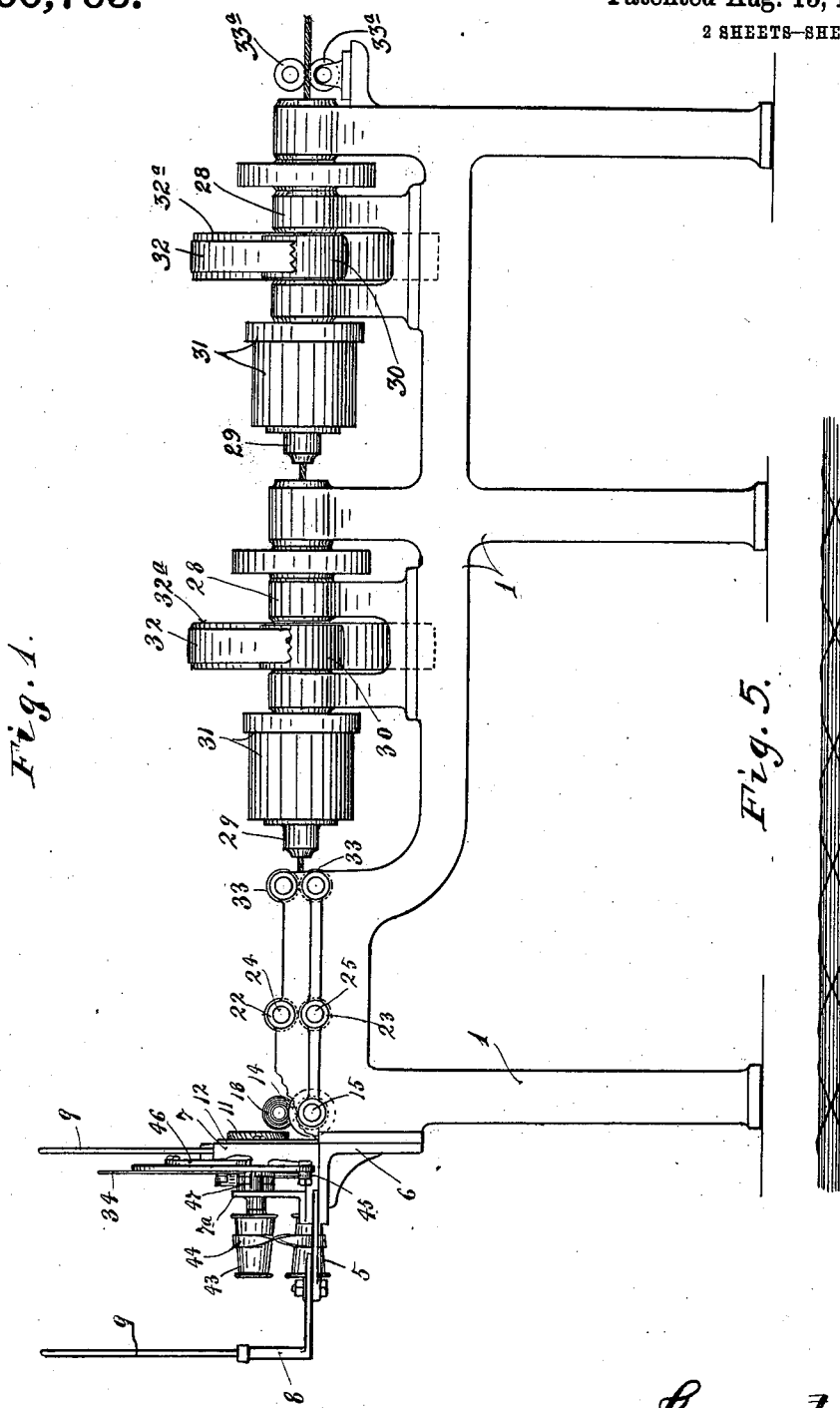

UNITED STATES PATENT OFFICE.

OSSIAN T. WAITE, OF OSHKOSH, WISCONSIN, ASSIGNOR TO WAITE GRASS CARPET CO., OF OSHKOSH, WISCONSIN, A CORPORATION OF WISCONSIN.

GRASS-TWINE MACHINE.

1,000,763.  Specification of Letters Patent.  Patented Aug. 15, 1911.

Application filed March 22, 1910. Serial No. 550,868.

*To all whom it may concern:*

Be it known that I, OSSIAN T. WAITE, a citizen of the United States, residing at Oshkosh, in the county of Winnebago and State of Wisconsin, have invented certain new and useful Improvements in Grass-Twine Machines, of which the following is a specification.

My invention has for its particular object the improvement of the construction and operation of grass twine machines of the general character disclosed and claimed in Letters Patent of the United States, No. 896,783, issued to Karl Wessel, of date August 25, 1908.

To the above ends, the invention consists of the novel devices and combinations of devices hereinafter described and defined in the claims.

The drawings of the said Wessel patent show a duplex or double machine, while the drawings of my present invention show a single machine, but it will be understood, of course, that, so far as my present invention is concerned, the machine may be made either single or double. My said invention improves the construction of the prior Wessel machine; first, in the construction of the so-called primary grass feeding or selecting mechanism; second, in the construction of the coöperating main rollers of the so-called secondary grass feeding mechanism; third, in the construction and operation of the so-called gathering rollers, which latter coöperate with the main rollers of the secondary feeding device, and, in a sense, constitute parts of the secondary feeding mechanism; and, fourth, in the provision of an improved attachment or auxiliary device for use in connection with the grass holder to insure a downward crowding action on the grass and the proper delivery thereof to the primary grass feeding or selecting mechanism.

In the accompanying drawings which illustrate the invention, like characters indicate like parts throughout the several views.

Referring to the drawings, Figure 1 is a view in side elevation, showing a grass twine machine embodying the several features of my invention; Fig. 2 is a plan view of the machine, with some parts broken away; Fig. 3 is a transverse vertical section, taken approximately on line $x^3\ x^3$ of Fig. 2; Fig. 4 is a fragmentary detail in rear elevation, showing the coöperating gathering rollers and parts of the driving connection therefor, some parts being broken away; and Fig. 5 is a detail, showing the double twist of the twine around the strands of grass.

All of the running parts of the machine are mounted, directly or indirectly, on a frame-work 1, which is preferably, but not essentially, of cast construction. The power is transmitted to the running parts of the machine through a power-driven countershaft 2, mounted in suitable bearings on one side of the frame 1, and provided with a driving pulley, not shown, and with beveled gears 3 and 4 and cone pulley 5.

Rigidly secured to the upper front portion of the frame 1 is a supporting shelf 6, having a vertically projecting flange 7 and a forwardly extended arm 8. Laterally spaced pairs of vertical rods 9 are secured to the flange 7 and extension bracket 8, and constitute the grass holder proper, adapted to contain the grass blades Y in the customary straight and compact arrangement.

Secured to the rear end of a short shaft 10, journaled in the vertical flange 7 and in a supplemental flange 7ª of the bracket 6, is a notched disk or toothed wheel 11, that runs in close contact with said vertical flange 7 and constitutes the grass selector of the primary grass feeding mechanism. Rigidly, but preferably adjustably, secured to the rear face of the vertical flange 7, in the plane of the notched selecting disk 11, is a throat regulating plate 12, which, adjacent to the abutting edge of said disk, is formed with a segmental guide surface that extends approximately concentric to but is spaced apart from said selecting disk, to afford a curved throat or segmental feed channel 13. It will, of course, be understood that the supporting flange 7 is cut away or formed with a segmental slot, which permits the free delivery of the grass blades laterally downward through the said feed throat 13.

Secured to the outer face of the selecting disk 11 is a relatively wide-faced feed wheel 11ª, the wide periphery of which is preferably knurled or otherwise roughened. This knurled periphery of said feed wheel 11ᵃ is of such diameter that the teeth or notched portion of the selecting disk 11 will project slightly beyond the same for proper action on the grass blades at the bottom of the holder and in the feed throat 13. This wide-faced feed wheel or auxiliary device serves to support the ends of the grass blades which project rearward beyond the narrow or thin selecting disk and the coöperating regulating plate, and prevents the grass blades from being bent close to the selecting disk. In the use of the selecting disk and regulating plate without this attachment, it was found that the grass blades would frequently, by the action of gravity or by the back drag, be bent close to the selecting disk, so that they would not be properly delivered laterally between the converging surfaces of the secondary feed rollers. It has been further found that, by the use of this wide-faced auxiliary feed wheel, the grass blades will be held straight for a considerable distance rearward of the selecting disk; and, furthermore, that the roughened surface of said auxiliary feed wheel assists in carrying the rear or butt ends of the grass blades downward through the feed throat 13 and between the converging surfaces of the secondary feed rollers. This attachment or auxiliary device also insures even and regular feed of the grass blades to the secondary feed rollers, and prevents clogging or back slipping of the grass blades within the feed throat.

The secondary feed device includes a roller 14, which extends transversely of the machine just in the rear of the primary or selecting wheel 11, and the shaft 15 of which is journaled in suitable bearings on the framework 1, and is provided with a spur gear 16 and a bevel gear 17 (see Fig. 3). Overlying and coöperating with the roller 14 is a tapered or pointed roller 18, the shaft or reduced portion 19 of which is mounted in suitable bearings on the framework 1, and is provided with a spur gear 20 that meshes with the spur gear 16 of the underlying shaft 15. The gears 16 and 20 connect the rollers 14 and 18 for rotary movements in reverse directions.

In the Wessel patent above identified, the tapered roller or head 18 was of approximately the same form as that illustrated in the present drawings, and it is provided with spiral threads, as in the present instance; but in the said patent, the lower roller for coöperating with the said threaded roller was a straight or cylindrical roller, and the two rollers were so arranged that the grass blades, fed downward in the throat 13 by the selecting disk 11, would be delivered laterally between the converging faces of the said rollers.

My present invention, as one of its important features, provides the lower roller 14 with a flaring threaded receiving end 21, which coöperates with the threaded tapered end of the roller 18 and very greatly facilitates the quick and even lateral delivery of the grass blades between the two coöperating rollers. The threads on the rollers 14 and 18 are in reverse directions, so that both coöperate to move the grass blades laterally in the same direction between the approximately straight or cylindrical portions of the two secondary feed rollers, where the grass blades will be fed by a resultant lateral and endwise movement. The threads on the upper tapered roller 18, it will be noted, extend to the right hand end of the lower roller 14, as viewed in Fig. 3, so that, after the grass blades have been fed endwise to a predetermined extent, they will be delivered laterally from between the two rollers 14 and 18. The threaded flaring portion 21 of the roller 14 may be made as an integral part thereof, or it may be made as a tapered sleeve and thereafter applied to said roller.

From the secondary feed rollers 14 and 18, the grass blades are fed endwise between the upper and lower so-called gathering rollers 22 and 23, which are carried, respectively, by shafts 24 and 25 journaled in suitable bearings on the framework 1, and connected for rotation in reverse directions by spur gears 26. The lower shaft 25 is provided, at its right hand end, as viewed in Figs. 2 and 3, with a bevel gear 27. It should be here noted that the bevel gear 17 of the shaft 15 meshes with the bevel gear 3 of the countershaft 2, and that the bevel gear 27 meshes with the bevel gear 4 of said countershaft. In this way, the rollers 14, 18, 22 and 23 are driven in the proper directions at the proper rates of speed. At least one of the gathering rollers, and, as shown, the lower roller 23, is provided with shallow right and left threads extending from its opposite ends and joining at the center of the roller, and these threads are so arranged that, under rotation of the coöperating gathering rollers, they will gather or collect the engaged grass blades at the central portions of the two rollers, and thereby deliver the same in a more closely assembled formation to the twine forming mechanism proper.

The twine forming mechanism may be of any suitable construction, but is preferably or substantially of the construction disclosed and claimed in the said Wessel patent. The parts thereof may, therefore, be briefly described as follows: Mounted in suitable bearings 28 on the framework 1, and in the rear projection of said framework, are hollow spindles 29, each provided with a pulley 30 at its rear portion, and constructed at its forward end to hold a thread-containing spool 31. These spindles and their spool holders, as shown, are rotated by belts 32, which run over the pulleys 30 and over larger pulleys 32ª carried by the countershaft 2. This double spindle construction is employed for the purpose of placing the twine around the strands with a reverse intersecting twist. The manner in which the twine is formed by the twine-forming mechanism proper is fully disclosed in the said Wessel patent, and, hence, need not be here repeated any further than to state that the direction of rotation of the two twine-forming mechanisms is reverse to one another. It may be here stated, however, that the grass blades, on passing from the gathering rollers 22 and 23, are delivered to a pair of coöperating so-called draw rolls 33, located in front of the twine-forming mechanism proper, and, after the twine has been formed, they are passed between a similar pair of draw wheels or rolls 33ª, located at the rear of the twine-forming mechanism and suitably journaled on the rear end projection of the frame-work 1. These draw wheels 33 and 33ª are, in practice, driven from the countershaft 2 by a gear mechanism of identically the same arrangement shown for driving the so-called gathering rollers 22 and 23. With this arrangement, the rollers 14, 18, 22, 23, 33 and 33ª are driven the same number of revolutions per minute, but in a direction from the front toward the rear of the machine, each coöperating set of rollers being successively made of a larger diameter, so that they will be given increased peripheral speed. The purpose of this is to increase the drawing action and to stretch the grass blades, both before and after they are formed into the completed twine.

In practice, it has been found necessary, or at least extremely desirable, to provide means for keeping the grass blades in the holder pressed down and into the receiving or upper end portion of the feed throat 13, and this I have effectually accomplished by the device best shown in Fig. 3. This device, as preferably constructed, comprises a lever 34, which is pivoted at 35 to the vertical flange 7 of the frame bracket 6, and, on its inner edge, is provided with a multiplicity of vertically spaced teeth 36, the lower edges of which are beveled, so that, when moved into the body of grass blades held in the holder, they will crowd the said blades downward. Pivoted at 37 to the flange 7 on the other side of the grass holder is a short upwardly extended lever 38, provided with a lateral projecting blade 39. The lower portion of the projecting end of this blade 39 is beveled and preferably formed with small teeth or serrations 40, which, when the blade is forced by the lever 38 into the position shown in Fig. 3, engages the grass blades and coöperates with the teeth 36 to crowd the said blades downward into the holder and into the receiving upper extremity of the feed throat 13. The levers 34 and 38 are oscillated approximately in alternate order from an eccentric 41 carried by a short countershaft 42 journaled in suitable bearings on the framework 1, and provided, at its outer end, with a cone pulley 43, over which and the cone pulley 5 of the countershaft 2 runs a driving belt 44. A crank rod 45 is intermediately mounted on the eccentric 41, and its lower end is pivoted to the lower end of the lever 34, while its upper end is connected by a link 46 to the upper end of the lever 38.

The selecting disk 11 and feed wheel 11ª are given rotary movement from the countershaft 42, and, as shown, this is accomplished through a train of speed reducing gears 47.

What I claim is:

1. In a machine of the kind described, a pair of feed rollers, one of which has a tapered end portion and the other of which has a flaring end portion affording coöperating surfaces that diverge from each other longitudinally of said rollers and are adapted to receive grass blades delivered laterally thereto, substantially as described.

2. In a machine of the kind described, a pair of feed rollers, one of which has a tapered end portion and the other of which has a flaring end portion affording coöperating surfaces that diverge from each other longitudinally of said rollers and are adapted to receive grass blades delivered laterally thereto, and at least one of which diverging surfaces has spiral threads for facilitating the lateral entry of the grass blades between the bodies of said rollers, substantially as described.

3. In a machine of the kind described, the combination with a primary grass feeding device, of a pair of feed rollers having surfaces that diverge from each other longitudinally of said rollers, adapting them to receive the grass blades delivered laterally thereto by said primary feeding device, at least one of which diverging surfaces has spiral threads operating to impart lateral movements to the grass engaged thereby, the said diverging surface of one of the rollers being convex and that of the other roller being concave, substantially as described.

4. In a machine of the kind described, the combination with a primary grass feeding device, of a pair of coöperating feed rollers, one of which has a tapered threaded end portion and the other of which rollers has a flaring threaded end portion, and which threaded end portions diverge from each other longitudinally of the rollers and are adapted to receive the grass blades delivered thereto by said primary feeding device and to feed the same laterally between the main body portion of said rollers, and the latter serving to impart endwise movements to said grass blades, substantially as described.

5. In a grass selecting and feeding mechanism, the combination with a grass holder, of a rotary notched selecting disk, a regulating plate coöperating therewith, and a feed wheel located adjacent to said selecting disk and arranged to rotate therewith, substantially as described.

6. In a machine of the kind described, the combination with a grass holder, of a rotary peripheral notched or toothed selecting disk, a coöperating regulating plate, approximately of the same thickness as the said selecting disk, and a feed wheel provided with a roughened periphery of slightly less diameter than said selecting disk, secured to one face of the latter and rotatable therewith, substantially as described.

7. In a machine of the kind described, the combination with a primary grass feeding mechanism, of secondary feed rollers arranged to receive the grass blades laterally from said primary feeding device and to feed the same endwise, of a pair of coöperating reversely driven gathering rollers between which the grass blades are fed endwise from said secondary feed rollers, at least one of which gathering rollers is provided with right and left threads extending from its end toward its central portion and arranged to cause the grass blades to be gathered or forced closely together in their passage between the said gathering rollers, substantially as described.

8. In a machine of the kind described, a pair of feed rolls, one of which has a tapered end portion and the other of which has a flaring end portion, affording coöperating surfaces spaced away from one another and adapted to receive grass blades delivered laterally therethrough, substantially as described.

9. In a machine of the character described, the combination with a grass holder, of a rotary selecting disk, having a serrated edge, a guide plate located in correlation to the selecting disk, to provide a channel therebetween for the grasses carried by the selecting disk, and a member rotatable with the selecting disk and serving to support the ends of the grasses carried by the selecting disk during their passage through the channel, substantially as described.

10. In a machine of the character described, the combination with a grass holder, of a rotary selecting disk, having a serrated edge, a guide plate located in correlation with the selecting disk, to provide a channel therebetween for the grasses carried by the selecting disk and serving to support the ends of the grasses carried by the selecting disk during their passage through the channel, a pair of feed rollers, one of which has a tapered end portion, and the other of which has a flaring end portion, affording coöperating surfaces spaced away from one another, the clearance between the rollers being in alinement with the channel, whereby grasses passing through the channel are gathered by said rollers and fed laterally therethrough, substantially as described.

11. In a machine of the character described, the combination with a grass holder, of a rotary selecting disk, having a serrated edge, a guide plate located in correlation with the selecting disk, to provide a channel therebetween for the grasses carried by the selecting disk and serving to support the ends of the grasses carried by the selecting disk during their passage through the channel, a pair of feed rollers, one of which has a tapered end portion, and the other of which has a flaring end portion, affording coöperating surfaces that diverge away from each other longitudinally of said rollers, the clearance between the rollers being in alinement with the channel, whereby grasses passing through the channel are gathered by said rollers and fed laterally therethrough, substantially as described.

12. In a device of the class described, the combination of a grass holder, members lying upon opposite sides of the grass holder at least one of said members extending longitudinally of said holder and terminating at a point midway the length of the holder, and means operatively connected for successively actuating the members with a swinging movement whereby they are swung toward the center of the holder and act to crowd the grasses therein downward, substantially as described.

13. In a device of the class described, the combination of a grass holder, members lying upon opposite sides of the grass holder, each of the members being provided with a sloping acting face extending at opposed angles to one another, said faces diverging away from one another from their upper toward their lower ends, and means operatively connected for actuating the members with a swinging action, whereby they are successively swung toward the center of the holder and their acting faces brought into engagement with the grasses to crowd the same downward within the holder, substantially as described.

14. In a device of the class described, the combination of a grass holder, a lever on one side of the grass holder extending upwardly and terminating at a point midway the length of the holder, said lever having a plurality of sloping acting faces spaced apart from one another and arranged in vertical alinement with one another, a blade upon the side of the holder having an end face sloping at an opposed angle to the faces on the lever, and means operatively connected for forcing the lever and blade successively toward the center of the holder whereby the acting faces are brought into engagement with the grasses to crowd the same downward within the holder, substantially as described.

15. In a device of the class described, the combination of a grass holder, a lever on one side of the grass holder extending upwardly and terminating at a point midway the length of the holder, said lever having a plurality of sloping acting faces spaced apart from one another and arranged in vertical alinement with one another a blade upon the opposite side of the holder having a separate face sloping at an opposed angle to the faces on the lever, an eccentric, a connection between the eccentric and lever, a connection between the blade and lever, whereby the operation of the eccentric forces the blade and lever successively toward the center of the holder whereby the acting faces are brought into engagement with the grasses to crowd the same downward within the holder, substantially as described.

16. In a machine of the kind described, the combination of a grass holder, members lying upon opposite sides of the grass holder, means operatively connected for actuating the members with a swinging action, whereby they are successively swung toward the center of the holders and act to crowd the grasses therein downward, a pair of feed rollers, one of which has a tapered end portion and the other of which has a flaring end portion, affording coöperating surfaces spaced away from one another and adapted to receive grass blades delivered laterally thereto, and means for carrying the blades from the holder to the feed rollers, substantially as described.

17. In a device of the class described, the combination of a grass holder, members lying upon opposite sides of the grass holder, means operatively connected for actuating the members with a swinging action, whereby they are successively swung toward the center of the holder and act to crowd the grasses therein downward, a rotary selecting disk, having a serrated edge, located in operative relation with the grass holder, a guide plate located in correlation to the selecting disk, to provide a channel therebetween for the grasses carried by the selecting disk, and a member rotatable with the selecting disk and serving to support the ends of the grasses carried by the selecting disk during their passage through the channel, substantially as described.

18. In a device of the class described, the combination of a grass holder, members lying on opposite sides of the grass holder, means operatively connected for actuating the members with a swinging action, whereby they are successively swung toward the center of the holder and act to crowd the grasses therein downward, a rotary selecting disk in operative relation to the grass holder, said disk having a serrated edge, a guide plate located in correlation to the selecting disk, to provide a channel therebetween for the grasses carried by the selecting disk and serving to support the ends of the grasses carried by the selecting disk during their passage through the channel, a pair of feed rollers, one of which has a tapered end portion and the other of which has a flaring end portion, affording coöperating surfaces spaced away from one another, the clearance between the rollers being in alinement with the channel, whereby grasses passing through the channel are gathered by said rollers and fed laterally therethrough, substantially as described.

19. In a device of the class described, the combination with grass feeding mechanism of companion mechanisms for wrapping a cord binder around said grasses, said mechanisms being located one behind the other in the direction of travel of the grasses and means operatively connected for actuating said mechanisms with a reverse direction of movement to one another, whereby the binder placed on the grasses by the first mechanism is in a reverse direction of winding to the binder placed on the grasses by the second mechanism whereby a binder formed of intersecting cords is placed around the grasses, substantially as described.

OSSIAN T. WAITE.

Witnesses:
  WM. P. BOND,
  THOMAS A. BANNING, Jr.

Copies of this patent may be obtained for five cents each, by addressing the "Commissioner of Patents, Washington, D. C."